(12) United States Patent
Al Bechlawi et al.

(10) Patent No.: US 11,184,104 B2
(45) Date of Patent: Nov. 23, 2021

(54) METHOD OF VARIABLE-BITRATE COMMUNICATION WITH SELECTION OF A TRANSMISSION INTERFACE AND CORRESPONDING DEVICE

(71) Applicant: ORANGE, Issy-les-Moulineaux (FR)

(72) Inventors: Carole Al Bechlawi, Chatillon (FR); Isabelle Siaud, Chatillon (FR); Anne-Marie Ulmer Moll, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/958,285

(22) PCT Filed: Dec. 18, 2018

(86) PCT No.: PCT/FR2018/053388
§ 371 (c)(1),
(2) Date: Jun. 26, 2020

(87) PCT Pub. No.: WO2019/129951
PCT Pub. Date: Jul. 4, 2019

(65) Prior Publication Data
US 2021/0058185 A1 Feb. 25, 2021

(30) Foreign Application Priority Data
Dec. 27, 2017 (FR) .................................... 1763272

(51) Int. Cl.
*H04J 1/16* (2006.01)
*H04L 1/00* (2006.01)
*H04L 23/00* (2006.01)

(52) U.S. Cl.
CPC .......... *H04L 1/0002* (2013.01); *H04L 1/0009* (2013.01); *H04L 1/0015* (2013.01)

(58) Field of Classification Search
CPC .... H04L 1/0002; H04L 1/0009; H04L 1/0015
(Continued)

(56) References Cited

U.S. PATENT DOCUMENTS 6,802,035 B2 * 10/2004 Catreux ............... H04L 1/0001
370/252
7,583,609 B2 * 9/2009 Catreux ............... H04L 1/0001
370/252

(Continued)

FOREIGN PATENT DOCUMENTS

| EP | 1515471 A1 | 3/2005 |
|---|---|---|
| EP | 2517365 A1 | 8/2019 |

(Continued)

OTHER PUBLICATIONS

English translation of the Written Opinion of the International Searching Authority dated Jun. 30, 2020 for corresponding International Application No. PCT/FR2018/053388, filed Dec. 18, 2018.

(Continued)

*Primary Examiner* — Tesfaldet Bocure
(74) *Attorney, Agent, or Firm* — David D. Brush; Westman, Champlin & Koehler, P.A.

(57) ABSTRACT

A method for selecting a mode of transmission for a first telecommunication entity of a communication signal to a second telecommunication entity, each mode determining a physical bitrate. The method includes: determining for a given mode a first metric corrected by a second metric, the first metric measuring at a given distance d a relative degradation by the medium for transmitting the signal resulting from a relative degradation linked to a multipath effect at the link level with respect to a Gaussian channel and from a relative degradation linked to an effect of attenuation of the medium with respect to a model of attenuation in free space, the second metric determining a ratio between a mean bitrate and the physical bitrate for this mode of transmission;

(Continued)

comparing for various modes of transmission, values of the first metric corrected to select at least one mode of transmission for distance d.

12 Claims, 3 Drawing Sheets

(58) Field of Classification Search
USPC .......................................... 375/377; 370/252
See application file for complete search history.

(56) References Cited

U.S. PATENT DOCUMENTS

| | | | |
|---|---|---|---|
| 8,867,637 B2 | 10/2014 | Siaud et al. | |
| 9,839,052 B2 | 12/2017 | Bouzigues et al. | |
| 2002/0147953 A1* | 10/2002 | Catreux | H04L 27/2601 |
| | | | 714/746 |
| 2008/0117930 A1* | 5/2008 | Chakareski | H04L 47/2416 |
| | | | 370/465 |

FOREIGN PATENT DOCUMENTS

| | | | |
|---|---|---|---|
| FR | 3007919 A1 | 1/2015 | |
| WO | 2011083238 A1 | 7/2011 | |
| WO | WO-2019129951 A1 * | 7/2019 | ............... H04B 3/54 |

OTHER PUBLICATIONS

PCT form IB338 of the International Searching Authority dated Jul. 9, 2020 for corresponding International Application No. PCT/FR2018/053388, filed Dec. 18, 2018.

International Search Report dated Feb. 19, 2019 for corresponding International Application No. PCT/FR2018/053388, filed Dec. 18, 2018.

Written Opinion of the International Searching Authority dated Feb. 19, 2019 for corresponding International Application No. PCT/FR2018/053388, filed Dec. 18, 2018.

A.S. Tanenbaum et al., "Computer Networks", 5th edition, ISBN 0-13-066102-3, Sep. 2010.

A.M. Cipriano et al., "Overview of ARQ and HARQ in Beyond 3G Systems", 2010 IEEE 21st International Symposium on Personal, Indoor and Mobile Radio Communications Workshops.

* cited by examiner

METHOD OF VARIABLE-BITRATE COMMUNICATION WITH SELECTION OF A TRANSMISSION INTERFACE AND CORRESPONDING DEVICE

CROSS-REFERENCE TO RELATED APPLICATIONS

This application is a Section 371 National Stage Application of International Application No. PCT/FR2018/053388, filed Dec. 18, 2018, the content of which is incorporated herein by reference in its entirety, and published as WO 2019/129951 on Jul. 4, 2019, not in English.

FIELD OF THE INVENTION

The present invention relates to the field of telecommunications. In this field, the invention relates more particularly to the so-called digital communications for which the useful bitrate can vary. Useful bitrate denotes the bitrate associated with the information bits transmitted over the PHY layer of at least one transmission interface. The digital communications comprise, in particular, wireless communications; they also comprise, for example, wired communications. The transmission medium for the communications is commonly called transmission or propagation channel, originally referring to an airborne channel and by extension referring to any channel.

As an example, the wired systems can have a transmission interface of PLT (power line transmission) type with a wired transmission channel which uses the power grid or an optical transmission interface with a transmission channel which can equally be wired (fiber optic) or airborne at the output of a diode for example. Wireless systems have a so-called RF transmission interface when it is a telecommunication system with an airborne transmission of a signal lying within a radio band (for example, of GSM, UMTS, 802.11x, 802.16e type).

PRIOR ART

The telecommunications systems are generally structured according to an architecture which complies with a layered organization according to the OSI communication model, standardized by the ISO (International Organization for Standardization).

The OSI communication model defines the management of data transmission service by means of seven stacked protocol layers: the physical layer (layer 1), the datalink layer (layer 2), the network layer (layer 3), the transport layer (layer 4), the session layer (layer 5), the presentation layer (layer 6) and the application layer (layer 7).

The first three layers 1, 2 and 3, called low layers, relate to the implementation of the connection and to the transportation of the data. The next four layers, called high layers, are responsible for the processing of the data. This organization therefore allows the telecommunication system to implement the service associated with the data processed.

The datalink protocols respond to the service requests originating from the network layer and perform their function by sending service requests to the physical layer.

The signaling interchanges between two communication entities separated by a transmission channel are controlled at the datalink layer by means of a structure of frames, called MAC (medium access control) frames. Referring to FIG. 1, the MAC frames are encapsulated in a frame structure, called physical frames PPDU (PHY protocol data unit), by the physical layer PHY before their transmission by the transmission channel. Such a physical frame comprises a header PHY HDR, a data field PSDU (PHY service data unit), a tail field TAIL and a padding field PAD. The data field PSDU is the so-called MAC frame MPDU (MAC protocol data unit). The MPDU frame comprises a header MAC HDR, a data field MSDU (MAC service data unit) and a frame checking field FCS (frame check sequence).

The telecommunication systems are oriented toward flexibility of the PHY/MAC transmission mechanism in order to deliver a given bitrate at a transmitter-receiver distance d with a guaranteed quality of service QoS (quality of service) at the PHY layer level by a target TEB (bit error ratio) (TEBc) that is optimal. These flexible systems comprise one or more transmission interfaces.

A transmission interface comprises the physical layer PHY which encompasses one or more transmission modes and the specific transmission protocols (MAC) for implementing these transmission modes.

Hereinafter in the document, transmission mode denotes a transmission technique (OFDM, MIMO technique (mapping spatial, spatial division multiplex, etc), spreading, etc.) associated with an error correcting coding (binary coding with CBS signal) and digital modulation scheme, scheme designated MCS (modulation and coding scheme, typically 16-QAM ⅓, 64-QAM ¾, etc) and a transmission band size Bw and with a transmission carrier frequency (optical, RF, etc., possibly of zero value) that makes it possible to generate the signal in a band of the spectrum dedicated to its transmission (baseband, radio band, infrared band, optical band) delivering a bitrate.

The notion of bitrate is broad and requires the context to be specified.

The physical bitrate D (PHY data rate) and the mean bitrate $D_{moy}$ (throughput) are distinguished.

The physical bitrate D is the maximum bitrate for a given transmission mode. The parameters affecting the physical bitrate D are: the modulation and coding scheme, the bandwidth, the number of spatial flows, the carrier frequency. This bitrate is calculated on the data field, usually denoted data payload or frame payload, incorporated in a PSDU (physical service data unit) unit and does not take account of the frame format at the MAC layer level.

The mean bitrate $D_{moy}$ is the quantity of information delivered by a given transmission mode during a certain time period. The calculation of the mean bit rate $D_{moy}$ is performed at the physical layer level (PPDU fame) and takes account of several factors including the conditions of the channel, the type of protocol employed (TCP/UDP), the time of non-transmission of the data linked to the acknowledgment and non-acknowledgment mechanisms upon the retransmission of the data (stop and wait [SAW], selective repeat [SR] (Tanenbaum, Andrew S., '*Computer Networks*', 4*th ed. ISBN* 0-13-066102-3), the retransmissions of packets associated with the HARQ (hybrid automatic repeat request) mechanisms of Chase combining and incremental redundancy type (A. M. Cipriano, P. Gagneur, G. Vivier and S. Sezginer, '*Overview of ARQ and HARQ in beyond 3G*', 2010, *PIMRC workshop*), etc.

Thus, to deliver a certain bitrate with a QoS at the distance d, it is possible to select a transmission mode from among several for one and the same communication entity of a so-called "flexible" telecommunication system. The selection relates therefore to the most suitable transmission mode to guarantee a bitrate and a QoS at the distance d.

The patent application WO2011083238 discloses a method for selecting a mode from among several transmission modes of one and the same telecommunication device to deliver a target physical bitrate D with a QoS at the distance d while minimizing the radiated power. The method determines a metric α which measures a relative degradation at the distance d introduced by the communication signal transmission medium for a given environment relative to a reference model of the transmission medium. The degradation is the result of a multipath effect and/or of an effect of attenuation of the transmission medium. The selected mode is that for which the metric is minimal. The use of a reference metric α whose value does not depend directly on the technology of the transmission interface associated with the given transmission mode makes it possible to compare with one another the values obtained for the metric α since this metric has a range of variation that is common to the different transmission modes particularly regardless of the power received by the second entity.

This method is therefore particularly advantageous since it makes it possible to select a transmission mode regardless of the technologies implemented by the associated interfaces. Particularly advantageously, the expression of the metric α eliminates the specific components of the communication signal corresponding to a carrier frequency associated with a transmission, particularly of RF (radio frequency, i.e. the signal is transmitted in a so-called radio frequency band), optical or wired type and allows for a common range of variation regardless of the received power level.

A communication entity can equally be a mobile or fixed terminal or an access point (of any type) of an access network.

SUMMARY OF THE INVENTION

The invention proposes a technique that makes it possible to improve the selection of a transmission mode suitable for guaranteeing the best bitrate and a quality of service QoS at a distance d for a communication entity comprising different transmission modes by taking account of the losses of transmitted frames and the repetition request mechanisms (of HARQ type) occurring beyond a certain distance threshold depending on the mode and on the conditions of propagation of the communication signal.

Thus, the subject of the invention is a method for selecting a transmission mode, intended for a first telecommunication entity comprising different transmission modes, of a communication signal intended for a second telecommunication entity, each mode determining a physical bitrate in bits/s. The method comprises:
- a determination for a given transmission mode, of the value of a first metric corrected by a second metric, the first metric measuring, at a given distance d, a relative degradation introduced by the communication signal transmission medium that is the result of a relative degradation linked to a multipath effect at the link level relative to a gaussian channel and the result of a relative degradation linked to an effect of attenuation of the transmission medium relative to a model of attenuation in free space, the second metric determining a ratio between a mean bitrate and the physical bitrate for this same transmission mode,
- a step of comparison, for different transmission modes, of the values of the corrected first metric to select at least one transmission mode for a given distance d.

Also subject of the invention is a communication entity comprising at least two different transmission modes ensuring a physical bitrate in bits/s.

Thus, a communication entity according to the invention comprises a computer for determining the value of a first metric α which measures a relative degradation at a given distance d introduced by the communication signal transmission medium that is the result of a relative degradation linked to a multipath effect at the link level relative to a gaussian channel and the result of a relative degradation linked to an effect of attenuation of the transmission medium relative to a model of attenuation in free space, for a given transmission mode,
- a computer for determining, at least beyond a distance threshold, the value of the first metric corrected by a second metric determining a ratio between a mean bitrate and the physical bitrate for a same given transmission mode,
- a module for comparing the values of the first metric α or of the first metric α corrected α' for different modes to select at least one transmission mode among these modes.

The second metric ν is a standardized measurement of the relative loss of bitrate between the physical bitrate and the mean bitrate at a distance d for a same transmission mode.

In correcting the metric α with this second metric ν which is a function of the mean bitrate and therefore of the bitrate really available at the PPDU frame level, a communication method and entity according to the invention take account of the variation of the bitrate introduced by the frame losses and by the implementation of the repetition mechanisms of HARQ (Chase combining, incremental redundancy) type while guaranteeing the best bitrate and a quality of service QoS at a distance d for a communication entity comprising different transmission modes. Given that the mean bitrate begins to deviate from the target physical bitrate beyond a distance threshold corresponding to a notable loss of frames and to the introduction of the repetition mechanisms, below this threshold, the metric α undergoes little or no correction and the method retains the advantages of the selection method based essentially on this metric α.

The use of the metric α more particularly makes it possible to compare transmission modes associated respectively with communication signal transmission carrier frequencies that are different and therefore, by implication, associated with different communication interfaces, for example of radio, optical or PLT (power line transmission) type, by comparing the different values of the metric calculated for each of these modes. The selection relates to the transmission modes for which the value of the metric satisfies a threshold criterion.

According to one embodiment of the invention, the mean bitrate $D_{moy}$ is estimated by a polynomial relationship of the form $D_{moy}=ad^2+bd+c$ with a, b and c determined coefficients. The coefficients are, for example, determined during simulations by linear regression.

According to one embodiment of the invention, only those transmission modes are retained for which the value of the metric satisfies a threshold for the given distance d corresponding generally to the distance between the first and second telecommunication entities. This threshold, beyond which a mode is rejected, is dynamic and depends on the modes available in the communication entities.

According to one embodiment of the invention, the first metric α is the result of a weighted sum of a relative degradation linked to the multipath effect MCM (multipath channel margin) and a relative degradation linked to the effect of attenuation of the transmission medium MCBE (narrowband channel margin). The weighting makes it possible, through the choice of the weighting values, to limit the calculations that are pointless, typically in the case where only one of the effects, multipaths or attenuation of the transmission medium, is perceptible given the environment of the two entities communicating.

According to one embodiment of the invention, the multipath effect MCM is determined by taking the difference between a multipath sensitivity threshold of the transmission mode and a sensitivity threshold of the transmission mode, the sensitivity threshold corresponding to a required minimum power to ensure a bitrate D with a target bit error ratio TEB representative of the quality of service QoS on a gaussian transmission medium. According to this mode, the measurement of the multipath effect is simple since it results from the subtraction of two values that are generally available in the form of curves in the technical documentation associated with an entity or else in the form of quality tables pre-established for each transmission mode available in the radio equipment.

According to one embodiment of the invention, the method further comprises, for the selected transmission modes:
- a step of determination of the value of a third metric β which measures the excess power available at the distance d, that is to say the difference between the power available on reception and the required minimum power for a radiation power (PIRE), for propagation conditions, for an antenna gain in reception and for a QoS that are given for the transmission mode MT considered,
- a choice of a transmission mode for which the third metric β crosses a given threshold.

According to this embodiment, the method determines a third metric β which takes account of the excess power between the available power and the power required for the transmission mode chosen according to the value of α'. This embodiment is particularly advantageous since it makes it possible to check that the selected mode is transmitted with sufficient power which exceeds the multipath sensitivity threshold of the second entity (the receiving entity) with a power margin adjusted according to the propagation conditions. The case whereby none of the modes provides sufficient power to exceed the threshold reflects the fact that the second entity (the receiving entity) is out of coverage of the first entity and requires a greater radiated power. After the selection of the transmission mode, the method can adjust the radiated power according to the excess power measured by the third metric β. Thus, in this case, the method further comprises a correction of the radiation power (PIRE) for the transmission mode chosen at the transmitter in order to limit the excess power and to reduce the value of the metric β.

According to one embodiment of the invention, the third metric β is corrected by the second metric.

According to one embodiment of the invention, the method consists in repeating, for different distances $d_j$, a selection method according to the invention. This embodiment makes it possible to cover several distances.

According to one embodiment of the invention, the third metric β is calculated according to the following relationship: $\beta = Gr + PIRE - \alpha - S - PL_{FS}(d)$, in which PIRE (equivalent radiated isotropic power) is the power radiated at the output of the transmission antenna of the transmitting entity, Gr is the gain of the antenna in reception, S is the minimum power required to ensure the bitrate D with a given QoS for a gaussian channel, $PL_{FS}(d)$ is the attenuation of propagation in free space.

According to one embodiment of the invention, the method further comprises a step of transmission of a dedicated preamble frame which comprises sequences dedicated to the estimation of the first metric α and/or of the second metric β for at least two different transmission modes. This embodiment makes it possible to simply obtain the measurement of the degradation linked to the multipath effect quasi-simultaneously for the different transmission modes that are candidates for selection.

According to one embodiment of the invention, the method further comprises an updating of the value of the first and third metrics α, β based on an estimation of the first and third metrics α, β made on the data (PSDU field) transmitted by the communication signal between the two entities. This embodiment allows for an updating of the value of the metrics in quasi real time since it is performed on the basis of the data field of a data frame. This updating particularly advantageously makes it possible to be able to adjust the selection of a transmission mode to the changes of the environment. Such changes can occur when one of the telecommunication entities is moving. This embodiment is therefore advantageous since it ensures a dynamic operation of the selection method.

According to one embodiment of the invention, a transmission mode being associated with a transmission interface $I_j$, the method further comprises a triggering of a transmission of a dedicated preamble frame which comprises sequences dedicated to the estimation of the transmission medium for at least two transmission interfaces of the system as soon as the value of the updated first metric α departs from a given interval $\alpha_{min} < \alpha j < \alpha_{max}$ and the mode selected on the basis of the updated third metric β is associated with a transmission interface distinct from that associated with the preceding selected mode. Depending on the changes of the environment, the value of the metric α can change notably and cross threshold values set for example at the end of simulations. The detection of these crossings and of the change of interface triggers a dedicated preamble frame which makes it possible to perform a measurement of the metric for different modes and to possibly select another transmission mode. This embodiment is therefore advantageous since it ensures a dynamic operation of the selection method and ensures an adaptation of the selection of the transmission mode to the changes of the environment without the intervention of any operator.

According to one embodiment of the invention, the communication entity comprises several transmission interfaces, the transmission modes being associated with one of the transmission interfaces, such that the transmission interfaces belong to a list comprising:
- an interface of PLT (CPL) type,
- an interface of RF radio type,
- an interface of optical type.

The previous various embodiments can be combined or not with one or more of these embodiments to define another embodiment.

Another subject of the invention is a telecommunication system with multiple transmission modes suitable for implementing a method according to the invention.

Thus, a telecommunication system according to the invention comprises a communication entity according to the invention.

According to a preferred implementation, the steps of the selection method according to the invention are determined by the instructions of a program incorporated in an electronic circuit such as a chip which can itself be disposed in an electronic device such as an access point, a base station or a terminal. The selection method, according to the invention, can equally be implemented when this program (or its modules) is loaded into a computation member such as a processor or equivalent whose operation is then controlled by the execution of the program.

Consequently, the invention applies also to a computer program (or its different modules), notably a computer program on or in an information medium, suitable for implementing the invention. This program can use any programming language, and be in the form of source code, object code, or intermediate code between source code and object code, such as in a partially compiled form, or in any other form desirable for implementing a method according to the invention.

The information medium can be any entity or device capable of storing the program. For example, the medium can comprise a storage means, such as a ROM, for example a CD ROM or a microelectronic circuit ROM, or even a magnetic storage means, for example a USB key or a hard disk.

Alternatively, the information medium can be an integrated circuit in which the program is incorporated, the circuit being adapted to execute or be used in the execution of the method concerned.

Also, the program can be translated into a transmissible form such as an electrical or optical signal, which can be routed via an electrical or optical cable, by radio or by other means. The program according to the invention can in particular be downloaded over a network of internet type.

LIST OF THE FIGURES

Other features and advantages of the invention will become apparent from the following description of particular examples given in light of the attached figures given by way of nonlimiting examples.

DESCRIPTION OF AN EMBODIMENT OF THE INVENTION

Figure 1:
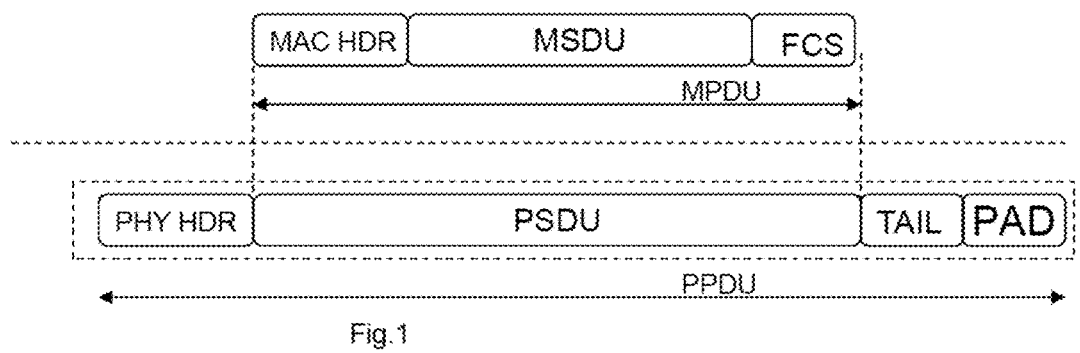
FIG. 1 is a schematic representation of the structure of a PPDU frame of the level one physical layer and of the corresponding MPDU frame of the level two MAC (media access control) layer, referring to the OSI model. The FCS field contains the bits, called cyclic redundancy check when an ARQ mechanism is put in place in the protocol for retransmission of the data at the MAC level.

The selection method according to the invention exploits the metric $\alpha$ corrected by a metric $v$ to compare the performances obtained with the different transmission modes while taking account of a bitrate variation, each mode being associated by definition with a transmission interface which can be identical and/or different between the different modes.

The metric $\alpha$ measures the relative degradation introduced by the transmission channel for a given telecommunication entity in a given environment relative to a reference model of the transmission medium, taking account, on the one hand, of the multipath effect and, on the other hand, of the attenuation of the propagation channel (PL(d)).

The metric $\alpha$ for a distance d is typically the result in dB of a weighted sum of an MCM degradation linked to the multipath effect and an MCBE (narrowband channel margin) degradation linked to the effect of attenuation of the transmission medium:

$$\alpha = \eta_1 MCM + \eta_2 MCBE \qquad (9)$$

The weighting coefficients $\eta_1, \eta_2$ have the default value of one.

The multipath effect of the propagation channel impacts the performances at the physical layer level (radio performances) relative to a transmission over a so-called perfect channel. The multipath effect is reflected by a relative degradation which limits the reliability of the link for a given transmission mode. The measurement of this degradation is obtained by the difference in dB of the multipath sensitivity threshold $S_M$ of the given transmission mode and of the sensitivity threshold S of this same mode at the same bitrate. This measurement is denoted by the acronym MCM which means "multipath channel margin". This MCM parameter makes it possible to compare the performance of different transmission modes at the link level.

The multipath sensitivity threshold $S_M$ of a transmission mode for a propagation scenario is the minimum power required to ensure a target physical transmission bitrate D in bits/s with a target bit error ratio TEB (QoS) when the propagation channel has multiple paths. The multipath sensitivity threshold $S_M$ depends:

on the signal-to-noise ratio required for the transmission mode to reach the target physical bitrate D and a target bit error ratio TEB associated with the QoS (target bit error ratio typically $10^{-5}$), on the thermal noise $P_b$.

The thermal noise $P_b$ expressed in dBm describes the imperfections of the components of the RF (radio frequency) stages of a communication entity. This thermal noise $P_b$ exhibits very different variations from one transmission mode considered to another as a function of the transmission bandwidth, of the noise temperature T of the receiver and of the spectral efficiency. The thermal noise $P_b$ is often expressed as a function of a reference value $P_{b_0}$ equal to −114 dBm corresponding to a reference noise temperature $T_0$ set at 290 K and to a transmission band of 1 MHz. The thermal noise contribution is given by:

$$P_b = 10 \text{ Log}(kTB_w) + L_0 = 10 \text{ Log}(kT_0) + 10 \text{ Log}(T/T_0) + 10 \text{ Log}(B_w) + L_0$$

$$P_b = -114 \text{ dBm} + 10 \log_{10}(B_{w_{MHz}}) + NF + L_0 \text{ (dBm)}$$

$$P_b = -114 \text{ dBm} + 10 \log_{10}(D) - 10 \log_{10}(\text{Eff}) + NF + L_0 \text{ (dBm)}$$

$$\text{Eff} = D/B_{w_{MHz}}) \qquad (1)$$

with T the noise temperature of the communication entity, NF the noise factor ($10 \log_{10} (T/T_0)$), $B_w$ the effective bandwidth of the transmission mode, $L_0$ the cable losses, k the Boltzmann constant and Eff the spectral efficiency of the transmission mode. The sensitivity threshold S does not depend on the transmitted power, or on antenna gains.

The multipath sensitivity threshold $S_M$ depends on the transmission mode, on the desired quality (target bit error ratio), on the thermal noise contribution, on the signal-to-noise ratio deduced from the simulations at the link level in a multipath context associated with a propagation scenario; it can be expressed as follows:

$$S_M = SNR + P_b \qquad (2)$$

$$S_M = SNR + kTB_w + L_0 = SNR + 10\text{Log}(kT) + 10\text{Log}(B_w) + L_0$$

$$S_M = SNR + 10\text{Log}(kT_0) + 10\text{Log}(T/T_0) + 10\text{Log}(B_w) + L_0$$

$$S_M = SNR - 114\ dBm + NF + 10\log_{10}(B_{w_{MHz}}) + L_0\ (dBm)$$

$$SNR_{TEBc=10^{-5}} = \left(\frac{Ebu}{N_0}\right)_{TEBc=10^{-5}} \frac{D}{B_w}$$

Considering the above equation of the $SNR_{TEBc=10^{-5}}$, the multipath sensitivity threshold $S_M$ can be expressed as a function of the bitrate D:

$$SNR_{BER=10^{-5}} = \left(\frac{Ebu}{N_0}\right)_{BER=10^{-5}} \frac{D}{B_w} \qquad (3)$$

$$S_M =$$

$$SNR + kTB_w + L_0 = \left(\frac{Ebu}{N_0}\right) + 10\text{Log}(kT) + 10\text{Log}(D_{Mbps}) + L_0$$

$$S_M = \left(\frac{Ebu}{N_0}\right) + 10\text{Log}(kT_0) + 10\text{Log}(T/T_0) + 10\text{Log}(D_{Mbps}) + L_0$$

$$S_M = \left(\frac{Ebu}{N_0}\right) - 114\ dBm + NF + 10\log_{10}(D_{Mbps}) + L_0\ (dBm)$$

The sensitivity threshold S of a transmission mode corresponds to the minimum power required to ensure the physical bitrate D, calculated over the data field, with a target bit error ratio (TEBc) representative of the QoS on a gaussian channel (perfect channel affected by a noise contribution AWGN (additive white gaussian noise)), that is to say without multiple path (typically a Dirac function). The expression of S is identical to that of $S_M$ using the notations:

$$\left(\frac{Ebu}{N_0}\right)_c^{AWGN} \text{ et } SNR_c^{AWGN}.$$

The multipath channel margin MCM is a dimensionless datum which can be deduced from several variables, SNR, $Ebu/N_0$ or minimum required power according to the following expressions:

$$MCM = \left(\frac{Ebu}{N_0}\right)_c - \left(\frac{Ebu}{N_0}\right)_c^{AWGN} \qquad (4)$$

$$MCM = SNR_c - SNR_c^{AWGN}$$

$$MCM = S_M - S$$

with $(Ebu/N_0)_c$ the average energy per useful bit divided by the noise spectral density which is required for a target bit error ratio TEBc, $SNR_c$ the corresponding signal-to-noise ratio and $S_M$ the minimum power required in reception for this same TEBc.

The MCM parameter corresponds to the additional power (or the variation of the signal-to-noise ratio $\Delta SNR$ in dB or to the variation of the energy per useful bit divided by the noise spectral density $\Delta Ebu/N_0$ in dB), in a multipath context, necessary to achieve a bit error ratio identical to the gaussian case, for a given transmission mode.

For one and the same bit error ratio and one and the same mode, the multipath channel margin MCM is the SNR difference obtained between, respectively, a gaussian channel and a multipath channel.

The effect of attenuation of the propagation channel in a multipath context and in a partially obstructive or obstructed link introduces an additional attenuation and leads to a reduction of the radio coverage (range) of a transmission interface, considering in succession an ideal point-to-point transmission without obstruction and a transmission in an environment comprising obstacles which obstruct the link and increase the attenuation due to the propagation channel. The attenuation due to the propagation channel modeled by an equation of the PL(d) type is a physical variable representative of the physical environment which is deduced from experimental measurements. The relative attenuation effect due to the propagation channel depends only on the environment and on the deployment scenario (range, antenna, etc.) and does not depend on the telecommunication entity apart from the impact of the transmission carrier frequency in the calculation of the attenuation. A signal transmitted with a power Pt is received at a distance d with a power Pr with Pr<Pt. The ratio between Pt and Pr represents the propagation attenuation for antenna gains equal to zero (the effect of the antennas (antenna gains GT and Gr) is not considered in order to provide the attenuation model for a given environment).

The simplest attenuation model is the model in free space deduced from the Friis transmission equation known to the person skilled in the art. This model corresponds to the attenuation when no obstacle obstructs the link. The distance dependency of the attenuation varies in $(d/d_0)^2$ in which d is the distance between the two measurement points and $d_0$ a reference distance generally set at 1 m. The formula of the Friis transmission equation is as follows:

$$PL_{FS}(d, fc)_{dB} = -27,55 + 20\ \log(fc_{MHz}) + 20\ \log(d_m/d_0 = 1\ m) \qquad (5)$$

with $d_m$ the distance expressed in m and $fc_{MHz}$ the carrier frequency expressed in MHz.

When the link is obstructed or slightly obstructed, the transmission equation is modified and the attenuation as a function of the distance is proportional to $(d/d_0)^n$ with n>2. The modified formula has the following form:

$$PL_{FS}(d, fc)_{dB} = PL_{FS}(d_0, fc)_{dB} + 10 \times n \times \log_{10}(d/d_0) + \sigma \qquad (6)$$

$$PL_{FS}(d_0, fc)_{dB} = PL_{FS}(d_0, fc_0)_{dB} + 20 \times \text{Log}(fc/fc_0) \qquad (7)$$

with $fc_0$ the reference frequency and $\sigma$ the standard deviation that are associated with the propagation model.

The MCBE (narrowband channel margin) parameter corresponds to the additional attenuation between the two configurations: obstructed space and free space; it makes it possible to quantify the effect of the transmission medium on the selection of a transmission interface. For a same distance and a same mode, the narrowband channel margin MCBE is the attenuation difference obtained between, respectively, the free space and the obstructed space.

This MCBE deviation no longer depends on the frequency RF explicitly and consequently makes it possible to take account only of the relative degradation of the medium, independently of the explicit attenuation of the frequency and of the transmission powers (the calculation of MCBE is done for a given distance d between transmitter and receiver). The MCBE parameter is expressed in the following form:

$$MCBE = \qquad (8)$$

$$PL_{MFS}(d) - PL_{FS}(d) = 10 \times n \times \log_{10}\left(\frac{d}{d_0}\right) - 10 \times \log_{10}\left(\frac{d}{d_0}\right)^2 + \sigma$$

$$MCBE = 10 \times \text{Log}\left(\left(\frac{d}{d_0}\right)^{n-2}\right) + \sigma$$

The MCBE parameter is calculated for a given environment with which there is associated an attenuation model.

The MCM parameter is determined for a target QoS, typically a target bit error ratio TEBc (for example TEBc=$10^{-5}$).

The metric $\alpha$ gives a good measurement of a relative degradation introduced by the transmission medium of the communication signal for a given environment relative to a reference model of the transmission medium, since MCM corresponds to the additional power necessary for a multipath channel relative to a reference gaussian channel to achieve a same bit error ratio and MCBE corresponds to the additional attenuation obtained for an attenuation model in obstructed space relative to that obtained for a reference attenuation model in free space.

Attenuation models are known to the person skilled in the art for each environment.

The metric $\nu$ is a standardized submetric expressed in dB, dimensionless, which reflects the ratio between the mean bitrate $D_{moy}$ and the physical bitrate D for a given distance d:

$$v(d)_{dB} = 10 \cdot \log_{10}\left(\frac{D_{moy}(d)}{D}\right) \qquad (10)$$

It corrects the expression of the metric $\alpha$ of the ratio between the mean bitrate $D_{moy}$ and the physical bitrate D of the same transmission mode: $\alpha' = \alpha - \nu$.

When there is no retransmission nor any packet loss, the metric $\nu$ has a value close to zero which does not significantly alter the metric $\alpha$. The selection then takes place simply on the basis of the metric $\alpha$ as long as the distance d is less than a distance threshold $d_0$ beyond which the metric $\nu$ becomes meaningful. Beyond the distance threshold $d_0$ the bitrate is degraded which increases the value of $\alpha'$. Taking the metric $\nu$ into account can thus lead to the transmission mode previously selected for a distance less than the threshold $d_0$ being eliminated and lead to the selection decision being modified. The distance threshold $d_0$ from which a mode is degraded depends on this mode and on the propagation conditions which induce a degradation of the quality (BER) and, if appropriate, a reduction of the received power level RSSI (received signal strength indicator).

Figure 2:
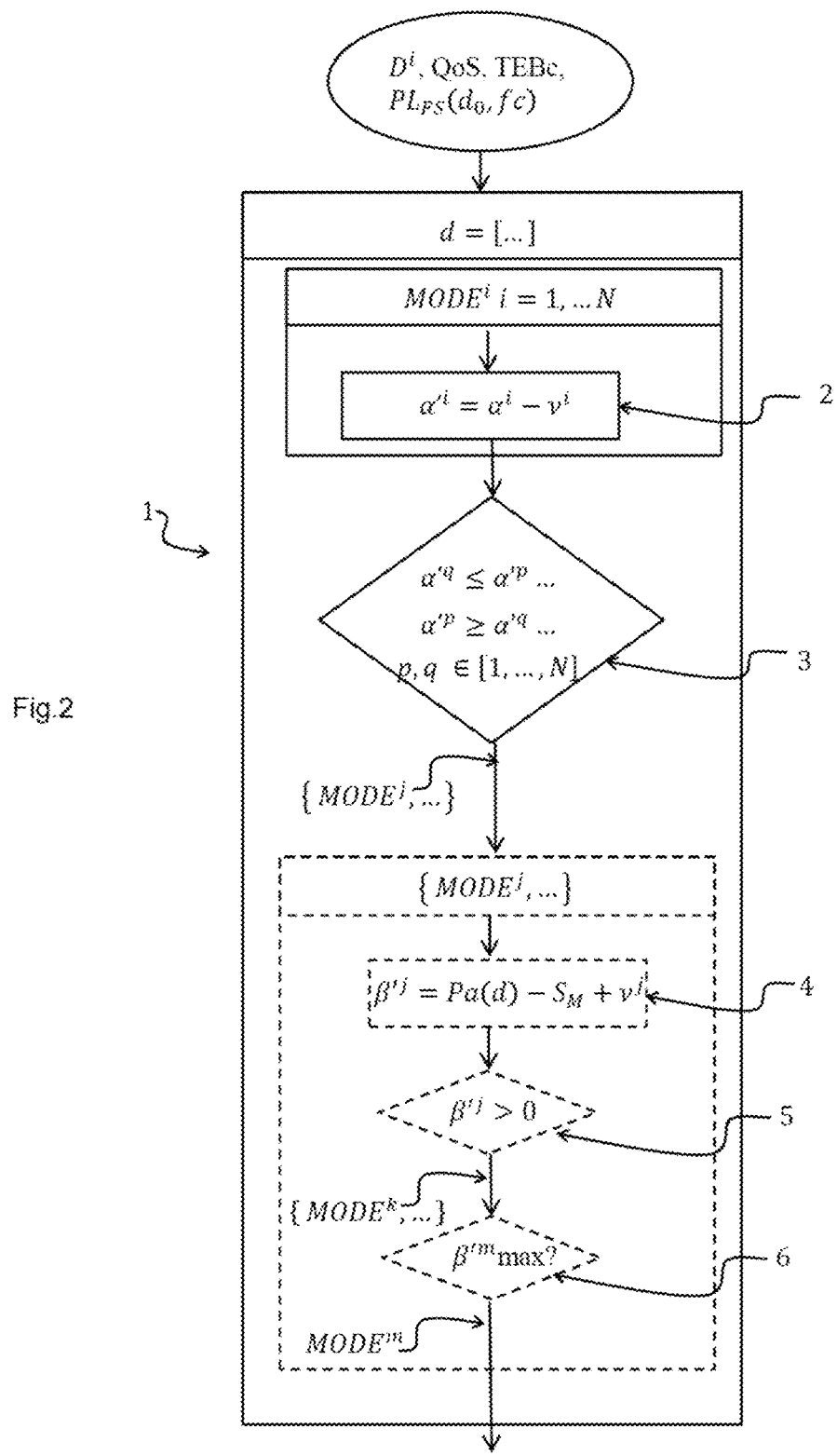
FIG. 2 is a flow diagram of a particular embodiment of a selection method according to the invention.

FIG. 2 is a flow diagram of a particular embodiment of a selection method according to the invention.

For a distance considered d and for each mode considered from among the different modes $MODE^i$ i=1, ... N, the method 1 comprises the determination 2 of the value of the first metric $\alpha^i$ corrected by the second metric $\nu^i$:$\alpha'^i = \alpha^i - \nu^i$, $\nu^i$ determining the ratio between the mean bitrate $D_{moy}^i$ and the physical bitrate $D^i$ for this same transmission mode.

For the distance considered d, the method 1 further comprises the comparison 3 of the values of the corrected first metric $\alpha'^i$ obtained for the different transmission modes considered $MODE^i$ i=1, ... N to select at least one transmission mode {$MODE^j$, ... }, j∈[1, ... , N].

According to one embodiment of the comparison step 3, the selection method 1 performs a scheduling according to the increasing values $\alpha'^q \leq \alpha'^p$ ... or decreasing values $\alpha'^q \geq \alpha'^p$ ..., p and q∈[1, ... , N] of the corrected first metric to select at least one transmission mode. The method can select the modes {$MODE^j$, ... } for which the value of the corrected first metric is minimal with a range of variation of 10%.

The steps of determination 2 and of comparison 3 are repeated for each new value considered for the distance d.

For each transmission mode $MODE^i$ there is a distance threshold $d_0^i$ beyond which the mean bitrate $D_{moy}^i$, obtained with this mode deviates from the physical bitrate $D^i$ obtained with this same mode.

When the distance d considered is less than the threshold $d_0^i$ of each of the transmission modes MODE, the selection method can determine as many values of the corrected metric $\alpha'^i$ as there are different transmission modes $MODE^1$, $MODE^2$ ... , $MODE^N$.

When the distance d considered is greater than the threshold d of a transmission mode $MODE^i$, this mode can be discarded in the comparison step based on the relative values between the modes considered of the corrected first metric $\alpha'^i$. At the very least, a mode is discarded when the mean bitrate that it obtains is close to zero.

According to one embodiment, for the selected transmission mode or the different selected transmission modes {$MODE^j$, ... }, the selection method 1 determines 4, for a selected transmission mode, the value of a third metric $\beta^j$ corrected by the second metric $\nu^j$:$\beta'^j = \beta^j + \nu^j$.

The third metric $\beta$ measures the excess power available at the distance d, that is to say the difference between the available power and the required minimum power: $\beta = Pa(d) - S_M$. The minimum power $S_M$ required to ensure a transmission bitrate D for a given transmission mode corresponds to the multipath sensitivity threshold. The available power Pa(d) depends on the environment considered, on the radiated power PIRE at the output of the transmission antenna and on the antenna gain in reception.

The value of the third metric $\beta$ varies notably with the noise contribution in a given transmission band which, when it increases, requires a stronger transmission power. The available power Pa(d) should be at least equal to the minimum power $S_M$ required to establish the communication according to a transmission mode selected on the basis of the first metric $\alpha$.

For a multipath propagation model, Pa(d) is given by:

$$Pa(d) = PIRE - PL_{MFS}(d) + Gr \text{ in dBm} \qquad (10)$$

with Gr the gain of the reception antenna, PIRE the radiated power at the output of the transmission antenna of the transmitting entity given by the expression:

$$PIRE = Pt + Gt \text{ in dBm} \qquad (11)$$

with Pt the power of the transmission antenna input, Gt the gain of the transmission antenna.

Also: $\alpha = MCM + MCBE = (S_M - S) + (PL_{MFS}(d) - PL_{FS}(d))$, i.e.: $-PL_{MFS}(d) - S_M = -PL_{FS}(d) - \alpha - S$, with S the minimum power required to ensure the physical bitrate D for a gaussian channel (perfect channel affected by an AWGN noise contribution).

Therefore $\beta = Pa(d) - S_M = PIRE - PL_{MFS}(d) - S_M + Gr$

The third metric $\beta$ can therefore be expressed according to the following relationship:

$$\beta = PIRE - PL_{FS}(d) - \alpha - S + Gr \qquad (12)$$

Given that the mean bitrate can vary as a function of the distance, the third metric β is corrected by the value of the second metric: $β'=Pa(d)-S_M+v$ This corrected third metric β' can therefore be expressed according to the following relationship:

$$β'=PIRE-PL_{FS}(d)+Gr-α-S+v$$

$$β'=PIRE-PL_{FS}(d)+Gr-(α-v)-S$$

$$β'=PIRE-PL_{FS}(d)+Gr-α'-S$$

Thus, the available power Pa(d) must be at least equal to the required minimum power $S_M$ to which there is added the power loss due to the reduction of the bitrate, a loss taken into account by the second metric to establish the communication according to a transmission mode selected on the basis of the corrected first metric α':

$$Pa(d) > S_{M-v} \text{ i.e.: } β'>0.$$

The corrected first metric α' assures the achievement of a certain quality, target QoS, typically a target bit error ratio $TEBc=10^{-5}$, to deliver a bitrate at the distance d and the corrected second metric β' makes it possible to check that the power available at the distance d for the selected mode is indeed sufficient.

The transmission modes $\{MODE^j, \ldots\}$, $j \in [1, \ldots, N]$, selected on the basis of the corrected first metric α' for which the corrected second metric β' is less than zero are discarded because they do not ensure a sufficient power at the distance d.

If several modes $\{MODE^k, \ldots\}$, $k \in [1, \ldots, N]$, of transmission lead to a corrected second metric β' greater than zero then the selection method chooses 6 a mode $MODE^m$, $m \in [1, \ldots, N]$, from among these modes $\{MODE^j, \ldots\}$. The chosen mode $MODE^m$ is that for which the corrected second metric is maximal between two values $β'_{min}$ and $β'_{max}$. $β'_{min}$ is equal to zero plus, possibly, a margin of ⅔ dB and $β'_{max}$ is of the order of 35 dB. Taking $β'_{max}$ into account is optional, and its aim is to limit the transmission powers and improve the coexistence between communication entities present in the same coverage zone.

Figure 3:
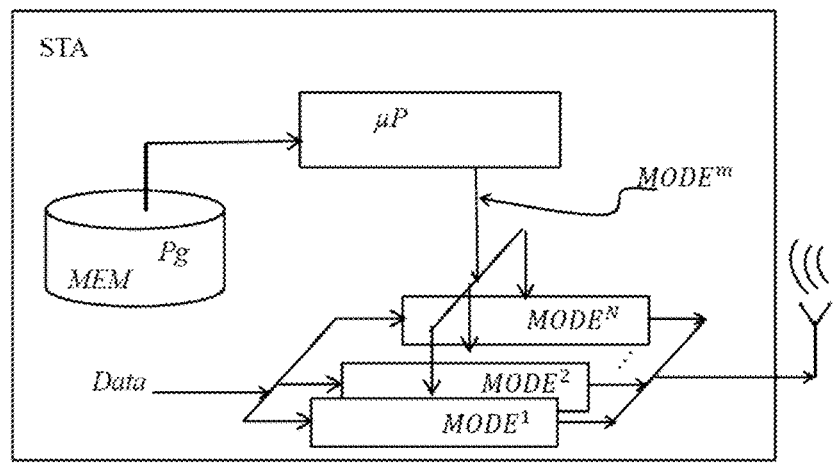
FIG. 3 is a diagram of the simplified structure of a communication entity according to the invention.

The method for selecting a transmission mode is implemented by a communication entity (access point, base station, terminal, etc.). The simplified structure of such an entity is described hereinbelow and illustrated by FIG. 3.

This entity STA comprises several transmission modes $MODE^1$, $MODE^2$, ..., $MODE^N$ that make it possible to achieve a certain bitrate. Each transmission mode is associated with a transmission interface. The entity comprises one or more different interfaces. When a communication is established with another communication entity (access point, base station, terminal, etc.), the choice of a common transmission mode $MODE^m$ must be made by the entities. This choice $MODE^m$ is made by the transmitting entity by implementing in particular a selection method according to the invention.

The entity STA comprises a memory MEM comprising a buffer memory and a processing unit μP equipped for example with a microprocessor and driven by a computer program Pg to implement a selection method according to the invention.

On initialization the code instructions of the computer program Pg are for example loaded into a fast memory before being executed by the processor of the processing unit μP.

The microprocessor of the processing unit μP implements a selection method according to the invention described previously, according to the instructions of the computer program Pg.

Figure 4:
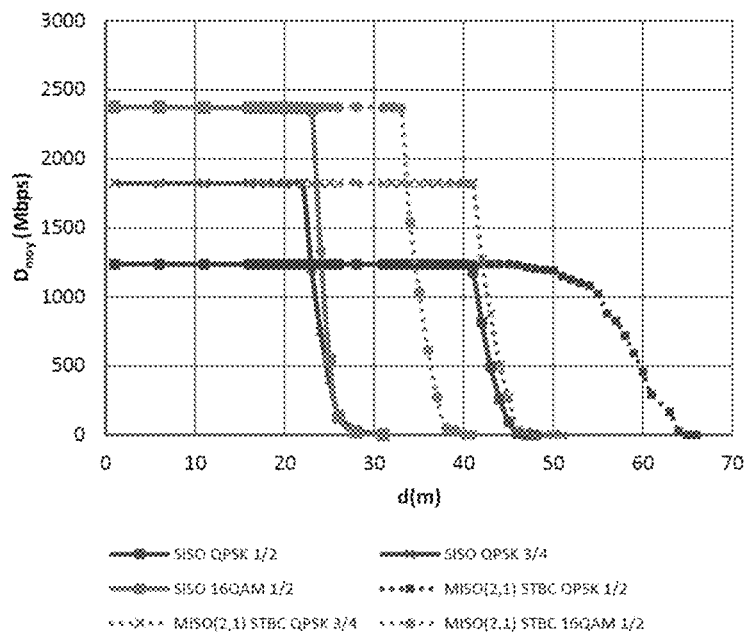
FIG. 4 represents curves of mean bitrate as a function of the distance obtained from simulations for different transmission modes of a communication entity.
Figure 5:
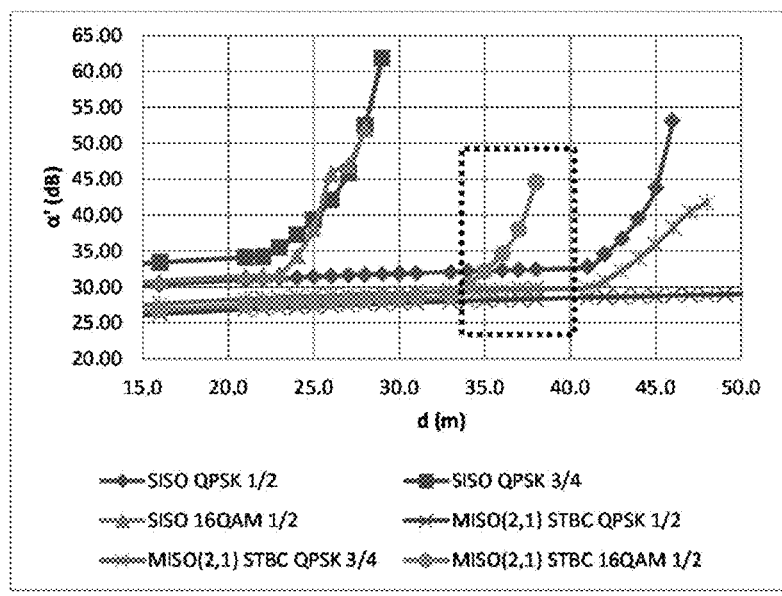
FIG. 5 represents the values of the corrected metric $\alpha'$ obtained for the mean bitrate values corresponding to the curves of FIG. 3 for the 15-50 m distance range.

The implementation of the method is illustrated by FIGS. 4 and 5 that are derived from simulations.

The simulated system considered is a single-technology system. It comprises a single transmission interface of IEEE 802.11ad type which operates at 60 GHz with a bandwidth of 2160 MHz. For such a system, a communication entity (access point, base station) and a terminal are considered that are separated by a distance d. Different transmission modes can be selected to deliver a target bitrate D.

According to the simulations, the access point AP sends, according to a communication protocol of CSMA/CA (carrier sense multiple access with collision avoidance) type, data packets to the terminal during a simulation time $T_{sim}$ with a given transmission mode making it possible to deliver a bitrate at a given distance. The distance d considered between the two devices is variable to obtain bitrate values at different distances.

On reception, the received power is calculated for the given distance d and as a function of the parameters of the propagation model. This received power makes it possible to determine a signal-to-noise ratio SNR. The probability of error per bit BER and consequently the probability of packet error PER are determined knowing the SNR and by using the quality tables predefined for each mode TM (transmission mode). In the case where the probability of packet error is zero, PER=0, all the packets transmitted are correctly received and the bitrate provided is the target physical bitrate. When the probability of packet error is greater than zero, PER>0, i.e. some packets are erroneous or absent at reception, retransmissions are requested which introduces latencies and therefore a loss of bitrate.

Thus, for each distance value d, the bitrate is calculated as a function of the number of packets correctly received which makes it possible to plot the curves which give the variation of the bitrate as a function of the distance d.

Parameterizable configurations make it possible to distinguish different transmission modes. A first type of configuration relies on a single-antenna technique SISO (single input single output), and a second type of configuration relies on an MISO technique (2,1) (multiple input single output). This second type of configuration is associated with a space-time block coding (STBC) using the Alamouti code. A single spatial flow is considered for this second type of configuration: the coded symbols are sent on two transmission antennas and received by a single reception antenna. Thus, the bitrate PPDU without retransmission or acknowledgment procedure (maximum bitrate $D_M$ on the PPDU layer) does not vary between these two types of configuration. According to the example, these two types of configuration are each associated with three different modulation and coding schemes (MCS):

| MCS | Modulation | Coding rate | D (Mbps) | $D_M$ (Mbps) |
|---|---|---|---|---|
| 15 | QPSK | ½ | 1386 | 1237 |
| 17 | QPSK | ¾ | 2079 | 1822 |
| 18 | 16QAM | ½ | 2772 | 2374 | to distinguish, according to the example, six different modes, $MODE^1$, $MODE^2$, ..., $MODE^6$, N=6.

The propagation model used is called OLOS (obstruct line of sight). This model represents the case in which an obstacle obstructs the main path. The parameters for this model are as follows: $d_0$=reference distance generally taken to be equal to 1 m, $f_c$=carrier frequency, σ=standard deviation of a gaussian random variable representing the mask effects and the variations of losses due to the movements of the obstacles in the propagation channel. The parameters of the losses due to the propagation model are recalled in the table below.

|  | OLOS |
| --- | --- |
| $PL_{FS} (d_0, f\ c)_{dB}$ | 59.83 |
| N | 2.56 |
| σ | 5.04 |

FIG. 4 represents the values of the mean bit rate $D_{moy}$ as a function of the distance d obtained at the end of the simulations. Each of the two types of configuration is combined with the three MCSs 15, 16 and 17 to define the six different transmission modes:

$MODE^i$={SISO QPSK ½, SISO QPSK ¾, SISO 16 QAM ½, MISO QPSK ½, MISO QPSK ¾, MISO 16 QAM ½ }.

Below a distance threshold d which depends on the mode $MODE^i$, the mean bitrate is substantially constant and substantially equal to the bitrate $D_M$ corresponding to the PPDU bitrate without HARQ or SAW and SR mechanisms. The bitrate PHY is the bitrate of the data payload field in the PSDU field (physical bitrate D). Above the threshold d the mean bitrate $D_{moy}$ varies.

For the SISO 16 QAM ½ and SISO QPSK ¾ modes, the threshold has a value lying between 20 and 25 m. For the MISO 16 QAM ½ mode, the threshold has a value lying between 30 and 35 m. For the SISO QPSK ½ and MISO QPSK ¾ modes, the threshold is equal to approximately 40 m. For the MISO QPSK ½ mode, the threshold has a value close to 50 m.

At least approximately from d=30 m, the SISO QPSK ¾ and SISO 16 QAM ½ modes have zero mean bitrates and therefore lead to invalid values of α'. It follows therefrom that, for this distance and the greater distances, the selection of the transmission mode excludes these two modes that have become out of radio range and compares the modes that are still valid. At least approximately from d=40 m, the MISO 16 QAM ½ mode has a zero mean bitrate and therefore leads to an invalid value of α'. It follows therefrom that, for at least this distance and the greater distances, the selection of the transmission mode excludes this mode which has become out of radio range and compares the modes that are still valid.

FIG. 5 illustrates the change of selection of a mode when the distance exceeds a threshold. This figure gives the value of the corrected metric α−v, called α', as a function of the distance. The values of α' are obtained for the same simulations as those having led to the bitrate values represented in FIG. 4.

Given the bitrate values represented in FIG. 4, the selection method leads to selecting between the SISO 16 QAM ½ and MISO 16 QAM ½ modes for the distances less than approximately 25 m on the basis of the first metric α. Beyond 25 m, the SISO 16 QAM ½ mode is invalidated on the basis of the corrected metric α given that the distance threshold is crossed for this mode. The selection method according to the invention based on the corrected metric α therefore leads to the selection of the MISO 16 QAM ½ mode for d≥25 m. The threshold for this MISO 16 QAM ½ mode has a value close to 33 m according to the illustration of FIG. 5. Thus, beyond this threshold, the selection method according to the invention based on the corrected metric α leads to this MISO 16 QAM ½ mode being eliminated in favor of a mode with a value less than α' compared to that obtained for the MISO 16 QAM ½ mode. According to the illustration, beyond approximately 36 m, the SISO QPSK ½, MISO QPSK and MISO QPSK modes lead to values of α' less than that obtained for the MISO 16 QAM ½ mode. Beyond approximately 36 m, the selected mode therefore forms part of one of these three modes. The MISO QPSK mode which leads to the metric α' with the lowest value is selected on the basis of this metric.

According to an embodiment relying on effective simulations and measurements of the PPDU bitrate of the simulation tool ns–3, after retransmission of packets in an HARQ mechanism, the mean bitrate $D_{moy}$ is approximated by a polynomial relationship of the form $D_{moy}=ad^2+bd+c$ with a, b and c coefficients determined during simulations by multiple linear regression. The aim is to approximate the function y=f(x) representative of a measurement by a second order polynomial function described by $g(x)=ax^2+bx+c$. In the context of the invention, this is the measurement of the bitrate $D_{moy}$ of the transmission mode considered as a function of each point x representative of a transmitter-receiver distance d. For this, the approximation method relies on the least squares method in which the minimization of the function $Rx=(Y-G(X))^2$ makes it possible to determine the coefficients a, b and c of the polynomial function. The minimization consists in calculating the partial derivative of the function Rx for each of the coefficients a, b and c to be determined and in considering the cancelation of these three equations with the partial derivatives. Three equations with three unknowns (a, b and c) (Kramer system) are then obtained that can be solved by conventional methods.

$$(Y - G(X))^2 = \sum_{i=1}^{N} (y_i - ax_i^2 - bx - c)^2$$

$$\frac{\partial}{\partial a}(Y - G(X))^2 = 0$$

$$\frac{\partial}{\partial b}(Y - G(X))^2 = 0$$

$$\frac{\partial}{\partial c}(Y - G(X))^2 = 0$$

Although the present disclosure has been described with reference to one or more examples, workers skilled in the art will recognize that changes may be made in form and detail without departing from the scope of the disclosure and/or the appended claims.

The invention claimed is:

1. A method for selecting a transmission mode, for a first telecommunication entity comprising various modes ($MODE^i$) of transmission, of a communication signal intended for a second telecommunication entity, each mode ($MODE^i$) determining a physical bitrate ($D^i$) in bits/s, wherein the method comprises the following acts performed by the first telecommunication entity:

determining for a given transmission mode ($MODE^i$), a value of a first metric ($α^i$) corrected by a second metric ($v^i$), the first metric ($α^i$) measuring, at a given distance d, a relative degradation introduced by the communication signal transmission medium that is the result of a relative degradation linked to a multipath effect at the link level relative to a Gaussian channel and that is the result of a relative degradation linked to an effect of attenuation of the transmission medium relative to a model of attenuation in free space, the second metric ($v^i$) determining a ratio between a mean bitrate ($D_{moy}^i$) and the physical bitrate ($D^i$) for this same transmission mode; and comparing, for different modes ($MODE^i$ i=1, ... N) of transmission, the values of the corrected first metric ($\alpha^i$) to select at least one transmission mode ({$MODE^j$, ... }) for a given distance d.

2. The method for selecting a transmission mode as claimed in claim 1, wherein the mean bitrate $D_{moy}$ is estimated by a polynomial relationship of the form $D_{moy}=ad^2+bd+c$ with a, b and c determined coefficients.

3. The method for selecting a transmission mode as claimed in claim 1, wherein the first metric ($\alpha$) is the result of a weighted sum of a relative degradation linked to the multipath effect and of a relative degradation linked to the effect of attenuation of the transmission medium.

4. The method for selecting a transmission mode as claimed in claim 1, whereby, for a distance d less than a distance threshold ($d_0^i$), the selection and comparison are made on the basis of the first metric ($\alpha$) calculated for different transmission modes determining a same physical bitrate D in bits/s.

5. The method for selecting a transmission mode as claimed in claim 1, whereby the multipath effect is determined taking the difference between a multipath sensitivity threshold of the transmission mode and a sensitivity threshold of the transmission mode, the sensitivity threshold corresponding to a minimum power required to ensure the physical bitrate D with a target bit error ratio TEB representative of a quality of service QoS on a Gaussian transmission medium.

6. The method for selecting a transmission mode as claimed in claim 1, further comprising, for the selected transmission modes:

determining a value of a third metric $\beta$ corrected by the value of the second metric, this third metric $\beta$ measuring excess power available at the distance d, which is the difference between the available power and a minimum power required to ensure the physical bitrate D with a target bit error ratio TEB representative of a quality of service QoS, choosing a transmission mode ($MODE^k$) for which the corrected third metric $\beta$ crosses a given threshold.

7. The method for selecting a transmission mode as claimed in claim 6, wherein the third metric $\beta$ is calculated according to the following relationship: $\beta=Gr+PIRE-\alpha-S-PL_{FS}(d)$, in which PIRE is a radiated power at an output of a transmission antenna of the first telecommunication entity, Gr is a gain of a reception antenna of the second telecommunication entity, S is the required minimum power to ensure the bitrate D with the given quality of service QoS for a Gaussian transmission medium, $PL_{Fs}(d)$ is attenuation of propagation in free space.

8. A communication entity comprising:
at least two different transmission modes ensuring a physical bitrate (D) in bits/s;
a processor; and
a non-transitory computer-readable medium comprising instructions stored thereon, which when executed by the processor configure the communication entity to:

determine a value of a first metric $\alpha$ which measures a relative degradation at a given distance d introduced by a communication signal transmission medium that is the result of a relative degradation linked to a multipath effect at a link level relative to a Gaussian channel and the result of a relative degradation linked to an effect of attenuation of the transmission medium relative to a model of attenuation in free space, for a given transmission mode, determine, at least beyond a distance threshold ($d_0^i$) the value of the first metric ($\alpha$) corrected by a second metric ($v$) determining a ratio between a mean bitrate ($D_{moy}^i$) and the physical bitrate (D) for a same given transmission mode, and compare values of the first metric $\alpha$ or of the corrected first metric $\alpha$ for different modes to select at least one transmission mode from among these modes.

9. The communication entity as claimed in claim 8, comprising several transmission interfaces, each of the transmission modes being associated with one of the transmission interfaces, such that the transmission interfaces belong to a list consisting of:

an interface of power line transmission type PLT (CPL),
an interface of radio type,
an interface of optical type.

10. A telecommunication system comprising the communication entity as claimed in claim 8.

11. A non-transitory computer-readable information medium comprising program instructions stored thereon for implementing a method for selecting a transmission mode, when said program is loaded and run in a first telecommunication entity, the first telecommunication entity comprising various modes ($MODE^i$) of transmission of a communication signal intended for a second telecommunication entity, each mode ($MODE^i$) determining a physical bitrate ($D^i$) in bits/s, and wherein the instructions configure the first telecommunication entity to:

determine for a given transmission mode ($MODE^i$), a value of a first metric ($\alpha^i$) corrected by a second metric ($v^i$), the first metric ($\alpha^i$) measuring, at a given distance d, a relative degradation introduced by the communication signal transmission medium that is the result of a relative degradation linked to a multipath effect at the link level relative to a Gaussian channel and that is the result of a relative degradation linked to an effect of attenuation of the transmission medium relative to a model of attenuation in free space, the second metric ($v^i$) determining a ratio between a mean bitrate ($D_{moy}^i$) and the physical bitrate ($D^i$) for this same transmission mode; and compare, for different modes ($MODE^i$ i=1, ... N) of transmission, the values of the corrected first metric ($\alpha^i$) to select at least one transmission mode ({$MODE^j$, ... }) for a given distance d.

12. The method for selecting a transmission mode as claimed in claim 1, comprising:

the first telecommunication entity transmitting the communication signal through a respective transmission interface using the selected at least one transmission mode.

* * * * *